Figure 1:
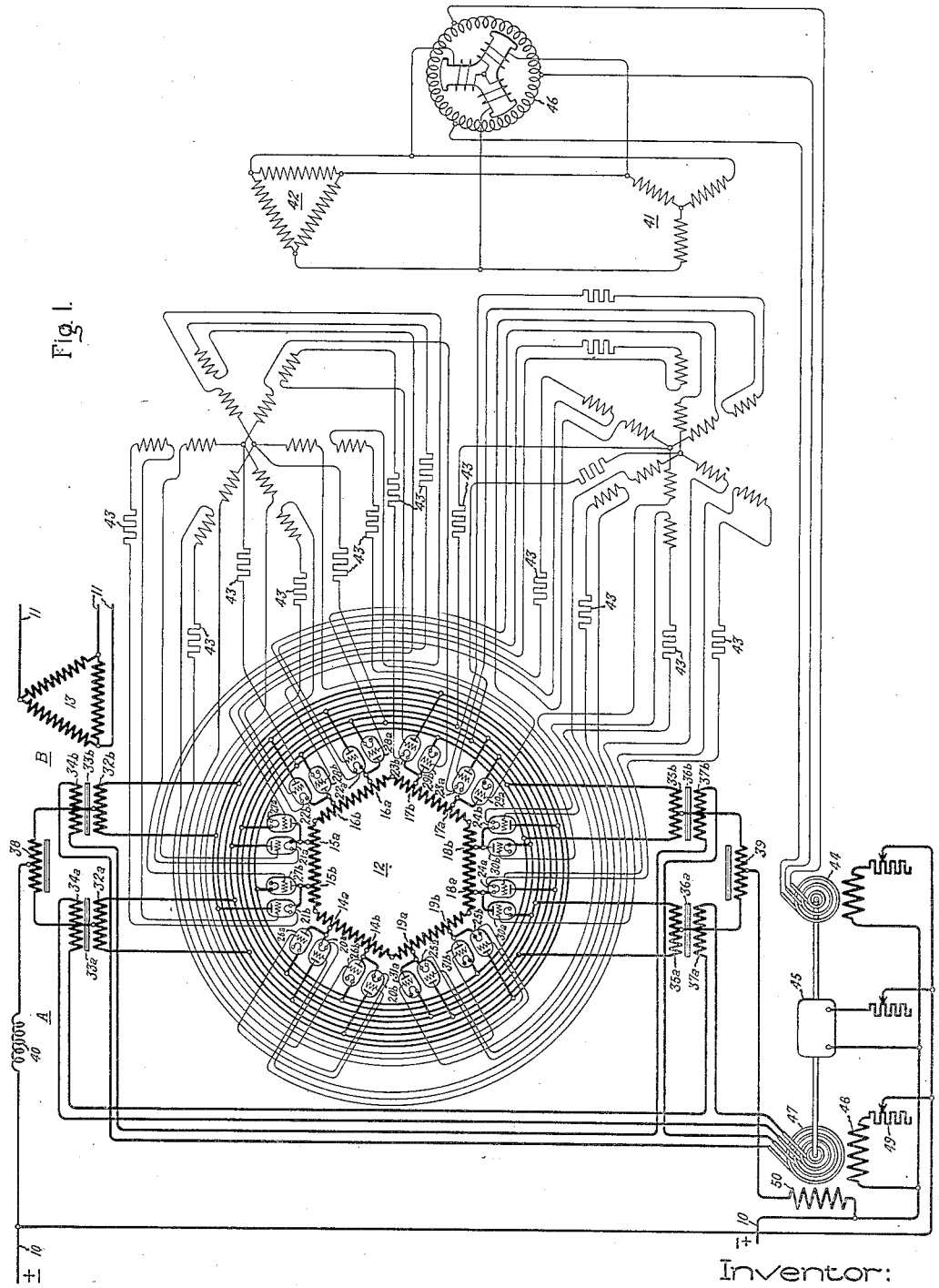

Inventor:
Clodius H. Willis,
by Charles ? Muller
His Attorney.

July 16, 1935.    C. H. WILLIS    2,008,533
ELECTRIC VALVE CONVERTING SYSTEM
Original Filed Dec. 16, 1932    2 Sheets-Sheet 2

Inventor:
Clodius H. Willis,
by Charles E. Tullar
His Attorney.

Patented July 16, 1935

2,008,533

UNITED STATES PATENT OFFICE 2,008,533

ELECTRIC VALVE CONVERTING SYSTEM

Clodius H. Willis, Princeton, N. J., assignor to General Electric Company, a corporation of New York Application December 16, 1932, Serial No. 647,589
Renewed November 24, 1934

11 Claims. (Cl. 175—363)

My invention relates to electric valve converting systems and more particularly to such systems including electric valves for transmitting energy between direct and alternating current systems, or independent alternating current circuits, under any desired power factor conditions.

Heretofore there have been devised numerous apparatus including electric valves for transmitting energy between direct and alternating current circuits, or between alternating current circuits of different frequencies, phases or voltages. The use of vapor electric discharge valves in such apparatus has been found particularly advantageous because of the relatively large amounts of power which can be handled at ordinary operating voltages. On the other hand the use of valves of this type has imposed certain power factor limitations upon certain of the arrangements of the prior art because of the commutation requirements of this type of valve. It is well understood in the art that the grid of a vapor electric discharge valve is effective to control the starting of current in the valve, but that the current in the valve can be interrupted only by means of the external circuit. It has already been proposed to provide such a converting system, usually comprising a polyphase inductive network interconnecting the supply and load circuit through a plurality of electric valves, with means for introducing into the apparatus a harmonic commutating potential which is effective to commutate the current between the several electric valves even against the electromotive force of the inductive network interconnecting the valves. By means of such an arrangement it is possible to operate the system under any desired power factor conditions on the alternating current circuit. In certain of the arrangements of the prior art, the harmonic commutating potential introduced into the apparatus has been provided by auxiliary apparatus and is maintained constant in amplitude. In certain other of the arrangements of the prior art, the harmonic commutating potential has been obtained by means of a commutating capacitor connected in series circuit relationship with the load current of the apparatus through a commutating transformer. With such an arrangement the magnitude of the commutating potential supplied by the capacitor increases directly with the magnitude of the load current transmitted by the apparatus. It has been found however that most satisfactory operation is obtained where the characteristics of the commutating potential are intermediate those just discussed. In particular, it has been found that very satisfactory operation may be obtained if the commutating potential comprises a component constant in amplitude and a component variable in amplitude in accordance with the load current of the apparatus.

It is an object of my invention therefore to provide an improved electric valve converting system for transmitting energy between direct and alternating current circuits or between independent alternating current circuits, by means of which the above mentioned desirable characteristics may be obtained and which will be simple and reliable in operation.

It is another object of my invention to provide an improved electric valve converting system for transmitting energy between direct and alternating current circuits or between independent alternating current circuits in which there is provided a source of commutating potential for enabling the apparatus to operate under any desired power factor conditions and in which the magnitude of the commutating potential is varied in accordance with the relation $$E = a + bI$$

where $E$ is the amplitude of the commutating potential, $I$ is the magnitude of the load current, and $a$ and $b$ are constants.

In accordance with one embodiment of my invention, direct and alternating current circuits are interconnected through a converting apparatus comprising a polyphase inductive network and a plurality of electric valves, while a commutating transformer is interposed in the connections between the electric valves and the direct current circuit. The commutating potential is supplied to the commutating transformer from a synchronous generator which supplies a frequency which is a harmonic of that of the alternating current circuit. The synchronous generator is provided with independent field windings, one of which is energized from a source of constant excitation, while the other is energized in accordance with the load current of the apparatus. With such an arrangement, the resultant commutating potential comprises a component constant in magnitude and a component variable in accordance with the load current of the apparatus.

In accordance with another modification of my invention, the harmonic commutating potential is supplied by means of capacitors connected across the commutating transformers, an arrangement well known in the art. In this modification, however, two commutating transformers and their associated capacitors are connected in series, and one of the commutating transformers is loaded through an inductive circuit, the impedance of which is controlled in response to the commutating potential to maintain the potential substantially constant in magnitude. The potential effective to commutate the current between the several electric valves is therefore the resultant of these two potentials, one of which is constant in magnitude and the other of which is variable in accordance with the load current of the apparatus.

For a better understanding of my invention, together with other and further objects thereof, reference is had to the following description taken in connection with the accompanying drawings, and its scope will be pointed out in the appended claims. In the drawings, Fig. 1 illustrates an apparatus embodying my invention for transmitting energy between a direct current circuit and a three-phase alternating current circuit of the general type disclosed in my copending application Serial No. 582,587, filed December 22, 1931, and assigned to the same assignee as the present application, while Fig. 2 shows a modification of the arrangement of Fig. 1 in which the commutating potential is supplied by means of static capacitors.

The present arrangement is an improvement of the invention disclosed in the United States patent application, Serial No. 582,587, which was made prior to this invention, and I, therefore, do not herein claim anything shown or described in said application, which is to be regarded as prior art with respect to this present application.

Figure 2:
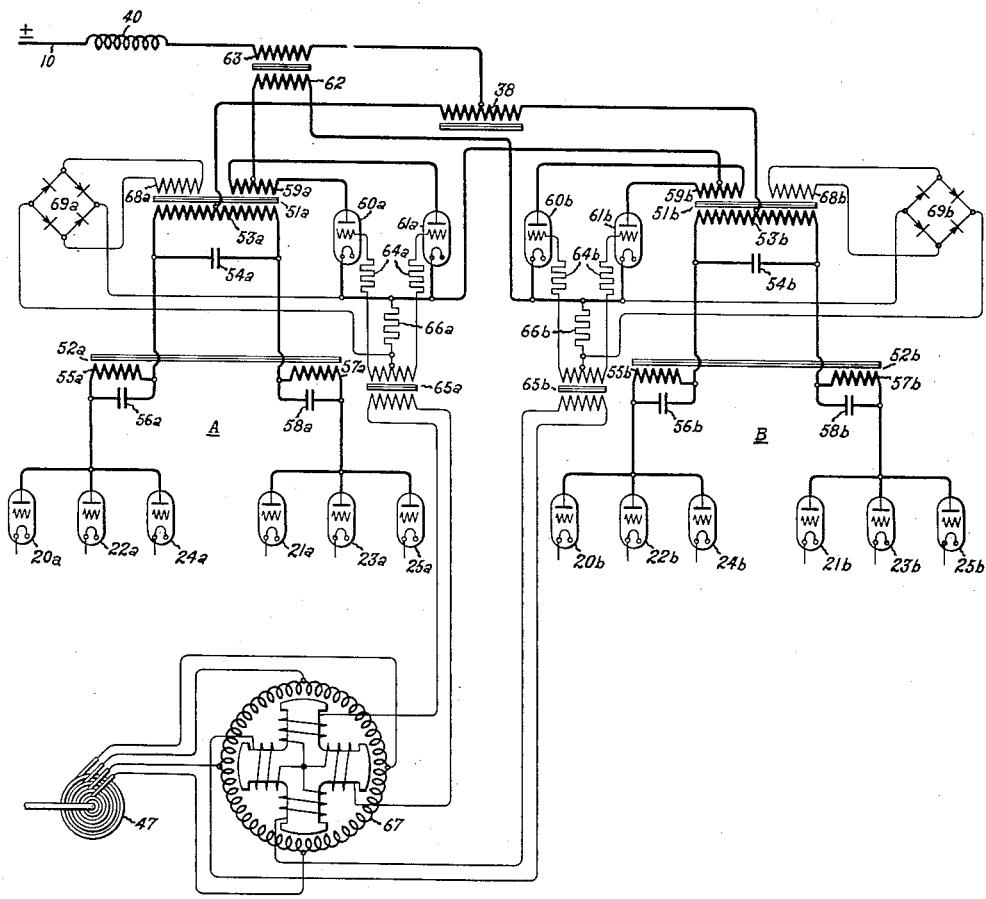

Referring now more particularly to Fig. 1 of the drawings, there is illustrated a double six-phase full wave electric valve converting system for transmitting energy between the direct current circuit 10 and a three-phase alternating current circuit 11. This arrangement includes a pair of electric valve converting apparatus A and B having a common six-phase inductive network 12 forming one winding system of a polyphase transformer provided with a three-phase winding 13 connected directly to the alternating current circuit 11. The apparatus A utilizes the terminals 14a–19a, inclusive, of the network 12, displaced in phase 60 electrical degrees from one another. The upper side of the direct current circuit 10 is connected to alternate phase terminals of the group 14a–19a, inclusive, through the left hand portion of the secondary winding 32a of a commutating transformer 33a and electric valves 20a, 22a and 24a, respectively, and to the other terminals of the groups 14a–19a through the right hand portion of the secondary winding 32a of the commutating transformer 33a through electric valves 21a, 23a and 25a. The electrical terminals 14a–19a, inclusive, are similarly connected to the other side of the direct current circuit 10 through the group of electric valves 26a–31a, inclusive, and opposite portions of the secondary winding 35a of a commutating transformer 36a. Similarly, the apparatus B involves an interconnection between the electrical terminals 14b–19b, inclusive, of the network 12 displaced 60 electrical degrees from each other and 30 electrical degrees from the corresponding phase terminals 14a–19a, inclusive. This connection is made to the positive side of the direct current circuit 10 through the group of electric valves 20b–25b, inclusive, and opposite portions of the secondary winding 32b of a commutating transformer 33b, and to the lower side of the direct current circuit 10 through a group of electric valves 26b–31b, inclusive, and opposite portions of the secondary winding 35b of a commutating transformer 36b. The electrical midpoints of the secondary windings 32a and 32b are connected to the upper side of the direct current circuit 10 through opposite halves of an interphase inductive winding 38, while the electrical midpoints of the secondary windings 35a and 35b are connected to the other side of the direct current circuit through opposite halves of an interphase inductive winding 39. A current smoothing reactor 40 is preferably included in the direct current circuit as illustrated. The electric valves 20a–31b, inclusive, are each provided with an anode, a cathode, and a control grid, and may be of any of the several types well known in the art, although I prefer to use vapor electric discharge valves.

In order to render the electric valves 20a–31a, inclusive, successively conductive in a proper sequence their grids are connected to their respective cathodes through secondary windings of proper phase relations of a polyphase grid transformer 41 and current limiting resistors 43. Similarly, the grids of the electric valves 20b–31b, inclusive, are excited from the secondary windings of proper phase relation of a grid transformer 42 through current limiting resistors 43. The primary windings of the grid transformers 41 and 42 are connected in Y and delta, respectively, in order to secure the proper phase displacement between the terminal voltages of their secondary windings. These grid transformers may be energized from any suitable source of alternating potential of a frequency which it is desired to supply to the circuit 11, such for example as a synchronous generator 44 driven by a direct current motor 45 energized from the direct current circuit 10. A rotary phase shifting transformer 46 is preferably interposed in the connections from the generator 44 to the primary windings of the grid transformers 41 and 42 in order to control the phase relation of the grid potentials impressed upon the grids of the several electric valves, and thus the energy transmitted by the apparatus and the power factor on the alternating current circuit 11. It will be understood, moreover, that in case the alternating current circuit 11 is connected to an independent source of electromotive force for determining its frequency, the primary winding of the rotary phase shifting transformer 46 may be energized directly therefrom.

In order to excite the commutating transformers 33a and 36a with commutating potentials of the proper characteristics, the primary windings 34a and 37a, respectively, are energized from a compound wound synchronous generator 47, the windings 34a and 37a being connected either in series as illustrated, or in parallel. Similarly, the primary windings 34b and 37b of the commutating transformers 33b and 36b, respectively, are connected in series across the other phase of the synchronous generator 47, since the potentials of the commutating transformers of the apparatus A and B are in quadrature. The synchronous generator 47 is provided with a field winding 48 energized from the direct current circuit 10 through a variable resistor 49 to produce in the generator 47 a component of alternating potential substantially constant in magnitude. The generator 47 is also provided with an exciting winding 50 connected in series with the direct current circuit, and thus effective to produce in the generator 47 a component of alternating potential variable in magnitude in accordance with the load current of the apparatus.

The general principles of operation of the above described apparatus are explained in detail in my copending application above referred to. A brief explanation of the operation will be given however. It will be assumed that it is desired to transmit energy from the direct current circuit 10 to the alternating current circuit 11 under lagging power factor conditions, that the axis of maximum electromotive force of the network 12 is vertical at the instant under consideration with its upper end positive, and that the phase rotation is in a counter-clockwise direction. It will also be assumed that, at the instant under consideration, electric valves 20a and 29a are conductive, that they are carrying substantially the full load current of the apparatus, and that current in electric valves 21b and 30b has been reduced to substantially zero or to a very small value. At the initial instant, when electric valves 20b and 29b are rendered conductive, the harmonic commutating potentials supplied to the commutating transformers 33b and 36b will have their maximum value, while those supplied to the commutating transformers 33a and 36a will be zero, since, as stated above, the commutating potentials of apparatus A and apparatus B are in quadrature. The potential of the commutating transformer 33b will then be effective to transfer any residual current from electric valve 21b to electric valve 20b against the electromotive force of the network 12 between the terminals 14b and 15b, and, similarly, the commutating potential supplied by the commutating transformer 36b will be effective to transfer the residual current from electric valve 30b to electric valve 29b against the electromotive force between the terminals 17b and 18b. This commutation is effected substantially instantaneously. At the same time, the potentials supplied by the commutating transformers 33b and 36b will be effective to transfer the current from electric valve 20a to electric valve 20b and from electric valve 29a to electric valve 29b against the electromotive force of the inductive network interconnecting these valves. However, it will be noted that the commutating path interconnecting electric valves 20a and 20b includes the interphase inductive winding 38, while that interconnecting the electric valves 29a and 29b includes the interphase inductive winding 39. The interphase inductive windings 38 and 39 are designed with sufficient leakage reactance to retard the transfer of current from electric valves 20a and 29a to electric valves 20b and 29b over a period of substantially 30 electrical degrees. At the end of this 30 electrical degree interval, electric valves 25a and 28a are rendered conductive, the commutating potential of the commutating transformers 33b and 36b has fallen to zero, while the potential of the commutating transformers 33a and 36a has risen to its maximum value and is effective to instantly transfer any residual current from electric valves 20a and 29a to electric valves 25a and 28a, respectively, and to gradually transfer the current from electric valves 20b and 29b to electric valves 25a and 28a over the succeeding 30 degree interval. In this manner, the current is successively commutated between the several electric valves of each converting apparatus and is alternately transferred back and forth between the apparatus A and the apparatus B each 30 electrical degrees The result is that the axis of conduction of the network 12 revolves uniformly at the frequency supplied by the alternating current generator 44, and polyphase alternating current of sinusoidal wave form is generated in the winding 13 and supplied to the alternating current circuit 11.

As stated above, it is desirable to have one component of commutating potential substantially constant in magnitude corresponding to the minimum value required to commutate the current between the several electric valves under no-load conditions. As the load on the converting system increases, and with it the ionization of the several electric valves, the potential required to commutate the current between the several electric valves of the same converting apparatus and to commutate the increased current between the converting apparatus through the reactance of the interphase inductive windings 38 and 39 increases correspondingly. Such a component of commutating potential increasing in magnitude with increase in load current is obtained by means of the exciting winding 50 of the generator 47, which is connected in series with the load current of the apparatus, as illustrated. In this manner the magnitude of the commutating potential of the apparatus varies in accordance with the relation $$E = a + bI$$

in which E is the commutating potential, I is the load current of the apparatus, and $a$ and $b$ are constants.

Fig. 2 illustrates the positive commutating circuit only, of a modified form of my invention. In this arrangement, the commutating transformer 33a is replaced by the commutating transformers 51a and 52a connected in series and the commutating transformer 33b, by the serially connected transformers 51b and 52b. The commutating transformer 51a is provided with a commutating winding 53a having an electrical midpoint connected to one terminal of the inductive interphase winding 38, while a commutating capacitor 54a is connected across the terminals of this winding which are connected in series with the windings 55a and 57a, respectively of the commutating transformer 52a. Commutating capacitors 56a and 58a are connected across the windings 55a and 57a, respectively. The terminals of the windings 55a and 57a are connected to the electric valves 20a, 22a and 24a, and 21a, 23a and 25a, as in the arrangement of Fig. 1. Similarly, the connection from the right hand terminal of the interphase inductive winding 38 to the electric valves 20b–25b, inclusive, is made through the series connected interphase transformers 51b and 52b, with the associated capacitors 54b, 56b and 58b. The commutating transformers 51a and 51b are provided with auxiliary windings 59a and 59b, respectively, connected with electric valves 60a and 61a, and 60b and 61b in a conventional manner to secure full wave rectification, while the direct current circuits of these two rectifier circuits are connected in series through an inductive winding 62 coupled to an inductive winding 63 included in the direct current circuit, as illustrated. Electric valves 60a, 61a, 60b and 61b are each provided with an anode, a cathode and a control grid and are also preferably of the vapor electric discharge type.

In order to control the phase and magnitude of the current transmitted by these two rectifying apparatus, the grids of the several electric valves 60a–61b, inclusive, are connected to their respective cathode circuits through current limiting resistors 64a–64b, opposite halves of the secondary windings of the grid transformers 65a–65b, and biasing resistors 66a–66b. The primary windings of the transformers 65a and 65b are energized from any source of alternating potential of a frequency equal to a harmonic of that of the alternating current circuit of the apparatus, such as the synchronous generator 47, through a rotary phase shifting transformer 67 for adjusting the phase of the grid potentials. The bias resistors 66a and 66b are energized with negative unidirectional potentials proportional to the commutating potential of the transformers 51a and 51b, respectively, by means of auxiliary windings 68a and 68b of these transformers, and rectifying means illustrated as contact rectifier bridges 69a and 69b, respectively.

The general principles of operation of the last described apparatus will be well understood by those skilled in the art. In brief, remembering that current flows in only one of the valves of each of the groups 20a–25a and 20b–25b, inclusive, and assuming the same operating conditions as assumed in explaining the operation of the apparatus of Fig. 1, if substantially the full load current is flowing initially in one of the electric valves, for example the valve 20a, the current in electric valve 21b has been reduced to substantially zero or a very small value. The current which has been flowing in electric valve 20a for the preceding thirty electrical degrees passes through the left hand portion of the inductive winding 53a and, neglecting the exciting current of the commutating transformer 51a, this current must be balanced by an equal and opposite current in the right hand portion of the winding 53a, which latter current flows through the capacitor 54a. This current, flowing in capacitor 54a, has been effective to reduce the previously accumulated charge thereon to substantially zero. Similarly, the charge on capacitors 56a and 58a have also been reduced to substantially zero. During the same interval, however, the current which has been decreasing in electric valve 21b has been effective to build up a charge on capacitors 54b, 56b, and 58b through commutating windings 53b and 57b, the capacitors being so charged that their left hand terminals are positive.

If, now electric valve 20b is rendered conductive, the resultant of the potentials across capacitors 54b and 58b is effective to commutate any residual current in the valve 21b to the valve 20b substantially instantaneously, as in the arrangement of Fig. 1. At the same time, this resultant potential is effective to commutate the current from the valve 20a to the valve 20b, but this latter commutation is effected through the interphase inductive winding 38 which retards the commutation over a period of substantially thirty electrical degrees. During this next thirty degree interval, the current building up through the left hand portion of the inductive winding 53b, and winding 55b and the electric valve 20b is effective to discharge the capacitors 54b, 56b and 58b. At the same time, the current flowing in electric valve 20a through the windings 53a and 55a charges capacitors 54a, 56a and 58a so that their right hand terminals are positive. At the end of this thirty degree interval, electric valve 25a is rendered conductive and the resultant of the potentials of the capacitors 54a, 56a and 58a is effective to transfer instantly any residual current from electric valve 20a to electric valve 25a, and to transfer gradually the current from electric valve 20b to electric valve 25a through the reactance of the interphase inductive winding 38. In this manner the current is successively commutated between the several electric valves as in the arrangement of Fig. 1. From the above it is seen that the several commutating capacitors are effectively in series with the load current of the apparatus, so that the magnitude of the commutating potential supplied thereby increases directly with the main load current.

In order to maintain the commutating potential supplied by the capacitors 54a and 54b substantially constant irrespective of variations in load, their associated commutating transformers 51a and 51b are loaded through the rectifying circuit comprising the winding 59a and valves 60a and 61a, and winding 59b and valves 60b and 61b. The current flowing in this rectifying circuit is controlled by means of the rotary phase shifting transformer 67 so that the current flowing in the rectifier circuit is substantially in quadrature lagging, thus comprising the equivalent of an inductive load on the commutating transformers. Since this rectifying circuit is energized from the commutating transformers 51a and 51b in parallel with capacitors 54a and 54b, the equivalent circuit connection is that of a parallel connected capacitor and reactor included in series with the load current of the apparatus. With such an arrangement, the current through the capacitor and that through the reactor are both substantially wattless currents and in phase opposition so that an increase in the reactor current, that is, the current in the rectifying circuit is accompanied by an equal increase in the capacitor current, which of course increases the commutating potential supplied by the capacitor. For example, if the rotary phase shifting transformer 67 is adjusted so that, under full load conditions, substantially no circulating current flows in the rectifier circuit, when the load on the apparatus decreases, tending to decrease the commutating potential supplied by the several capacitors, the negative bias impressed upon resistors 66a and 66b from the windings 68a and 68b, respectively, is correspondingly decreased, which, with the sinusoidal grid potential supplied by the rotary phase shifting transformer, is effective to advance the point in the cycle at which each of the several valves 60a–61b becomes conductive, and increase the circulating current in the rectifying circuit. An increase in this circulating current, as stated above, increases the capacitor circuit current and its terminal potential. Successively decreasing load currents successively increase the amount of circulating current flowing through the rectifying circuit, thus loading the commutating transformers to maintain the commutating potential of these transformers substantially constant. Obviously, the converse operation takes place in case of an increase in load on the apparatus. The ripple voltage appearing across the inductive winding 62 is a sixth harmonic, as is also that appearing across the main smoothing reactor 63 in the direct current circuit. By coupling these two reactors, as illustrated, their rating may be substantially decreased and the performance of the apparatus improved. With such an arrangement it may be permissible in certain instances to omit the additional reactor 49.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric valve converting system comprising a direct current circuit, an alternating current circuit, electric valve converting apparatus interconnecting said circuits and comprising a polyphase inductive network, a plurality of electric valves, and means for controlling the conductivity of said valves, and means for introducing into said apparatus an alternating potential to commutate the current between said valves against the electromotive force of said network under any desired power factor conditions on said alternating current circuit and for varying the magnitude of said commutating potential in accordance with the relation:

$$E = a + bI$$

where E is the amplitude of the commutating potential, I is the value of the current transmitted by the apparatus and $a$ and $b$ are constants.

2. An electric valve converting system comprising a direct current circuit, an alternating current circuit, electric valve converting apparatus interconnecting said circuits and comprising a polyphase inductive network, a plurality of electric valves, and means for controlling the conductivity of said valves, means for producing a component of commutating potential substantially constant in magnitude, means for producing a component of commutating potential variable in accordance with the load transmitted by said apparatus, and a circuit for introducing into said apparatus the resultant of said commutating potentials to transfer the current between said valves against the electromotive force of said network under any desired power factor conditions on said alternating current circuit.

3. An electric valve converting system comprising a direct current circuit, an alternating current circuit, an $n$-phase electric valve converting apparatus interconnecting said circuits and comprising a polyphase inductive network, a plurality of electric valves, and means for controlling the conductivity of said valves, means for producing a harmonic alternating potential of a frequency $n/2$ times that of said alternating current circuit, a circuit for introducing said harmonic potential into said apparatus to commutate the current between said valves against the electromotive force of said network under any desired power factor conditions on said alternating current circuit, and means for varying the magnitude of said commutating potential in accordance with the relation:

$$E = a + bI$$

where E is the amplitude of the commutating potential, I is the value of the current transmitted by the apparatus, and $a$ and $b$ are constants.

4. An electric valve converting system comprising a direct current circuit, an alternating current circuit, an $n$-phase polyphase electric valve converting apparatus interconnecting said circuits and comprising a polyphase inductive network and two groups of electric valves, the connections of the valves of said groups being in staggered phase relation, means for controlling the conductivity of said valves, a commutating winding interconnecting the valves of said groups, means for producing across said commutating winding a harmonic alternating potential of a frequency $n/2$ times that of said alternating current circuit to commutate the current between said valves against the electromotive force of said network under any desired power factor conditions on said alternating current circuit, and means for varying the magnitude of said commutating potential in accordance with the relation:

$$E = a + bI$$

where E is the amplitude of the commutating potential, I is the value of the current transmitted by the apparatus, and $a$ and $b$ are constants.

5. An electric valve converting system comprising a direct current circuit, an alternating current circuit, electric valve converting apparatus interconnecting said circuits and comprising a polyphase inductive network, a plurality of electric valves, and means for controlling the conductivity of said valves, and an alternating current generator provided with a winding for producing a substantially constant component of alternating potential and a winding for producing a component of alternating potential variable in accordance with the load transmitted by said apparatus, said generator being connected in circuit with said apparatus to commutate the current between said valves against the electromotive force of said network under any desired power factor conditions on said alternating current circuit.

6. An electric valve converting system comprising a direct current circuit, an alternating current circuit, electric valve converting apparatus interconnecting said circuits and comprising a polyphase inductive network, a plurality of electric valves, and means for controlling the conductivity of said valves, and an alternating current generator provided with a pair of exciting windings, a source of substantially constant energization for one of said exciting windings, the other of said windings being energized with the load current of said apparatus, said generator being connected in circuit with said apparatus to commutate the current between said valves against the electromotive force of said network under any desired power factor conditions on said alternating current circuit.

7. An electric valve converting system comprising a direct current circuit, an alternating current circuit, electric valve converting apparatus interconnecting said circuits and including a polyphase inductive network, a plurality of electric valves, and means for controlling the conductivity of said valves, a pair of capacitors connected in series circuit relationship with the load current of said apparatus, means for maintaining the terminal potential of one of said capacitors substantially constant irrespective of variations in load current, and a circuit for utilizing the resultant of the potentials of said capacitors to commutate the current between said valves against the electromotive force of said network under any desired power factor conditions on said alternating current circuit.

8. An electric valve converting system comprising a direct current circuit, an alternating current circuit, electric valve converting apparatus interconnecting said circuits and including a polyphase inductive network, a plurality of electric valves, and means for controlling the conductivity of said valves, a pair of capacitors connected in series circuit relationship with the load current of said apparatus, means including a grid controlled electric valve for loading one of said capacitors, means responsive to the potential of said one of said capacitors for controlling the grid potential of said valve, and a circuit for utilizing the resultant of the potentials of said capacitors to commutate the current between said valves against the electromotive force of said network under any desired power factor conditions on said alternating current circuit.

9. An electric valve converting system comprising a direct current circuit, an alternating current circuit, electric valve converting apparatus interconnecting said circuits and including a polyphase inductive network, a plurality of electric valves, and means for controlling the conductivity of said valves, a pair of serially connected inductive devices interposed in the connections between said valves and said direct current circuit, a capacitor in series circuit relationship with each of said inductive devices, the resultant of the potentials of said capacitors being effective to commutate the current between said valves under any desired power factor conditions on said alternating current circuit, a reactor, a pair of grid controlled electric valves connected to short circuit one of said inductive devices, and means responsive to the terminal potential thereof for controlling the grid potentials of said pair of valves.

10. An electric valve converting system comprising a direct current circuit, an alternating current circuit, electric valve converting apparatus interconnecting said circuits and including a polyphase inductive network, a plurality of electric valves, and means for controlling the conductivity of said valves, an inductive device comprising an inductive winding provided with an electrical midpoint connected to said direct current circuit, a capacitor connected between the end terminals of said winding, each of said terminals being connected to a group of said valves, a parallel connected inductive winding and capacitor interposed in each of the connections of said first mentioned inductive winding to said groups of valves, the resultant potentials of said capacitors being effective to commutate the current between said valves under any desired power factor conditions on said alternating current circuit, a reactor, a pair of grid controlled electric valves connected to short circuit said first mentioned inductive winding through said reactor, means for impressing upon the grids of said pair of valves alternating potentials variable in phase, and rectifying means energized from said first mentioned inductive winding for impressing a negative bias potential upon the grids of said pair of valves.

11. An electric valve converting system comprising a direct current circuit, an alternating current circuit, a pair of electric valve converting apparatus interconnecting said circuits, each comprising a polyphase inductive network and a plurality of electric valves, means for alternately rendering conductive successive valves of said pair of converting apparatus, means for introducing into said apparatus an alternating potential to commutate the current between said apparatus and to commutate the current between the valves of each apparatus against the electromotive force of said network under any desired power factor conditions on said alternating current circuit and for varying the magnitude of said commutating potential in accordance with the relation:

$$E = a + bI$$

where $E$ is the amplitude of the commutating potential, $I$ is the value of the current transmitted by the apparatus, and $a$ and $b$ are constants, and an interphase inductive winding interconnecting said apparatus with said direct current circuit and designed with such a reactance as to retard the transfer of current between said apparatus over a period equal to the time displacement between the conductive cycles of sequentially adjacent valves for effecting a uniform rotation of the axis of conduction of said apparatus.

CLODIUS H. WILLIS.